United States Patent
Chang

(12) 
(10) Patent No.: US 6,203,458 B1
(45) Date of Patent: Mar. 20, 2001

(54) SPEED ADJUSTING DEVICE FOR A DRILL PRESS

(76) Inventor: Hou-Sheng Chang, No. 3, Lane 144, Chung-Yang Rd., Feng-Yuan City, Tatchung (TW)

(*) Notice: Subject to any disclaimer, the term of this patent is extended or adjusted under 35 U.S.C. 154(b) by 0 days.

(21) Appl. No.: 09/330,201

(22) Filed: Jun. 11, 1999

(51) Int. Cl.[7] .............................. B23B 47/16; F16H 9/14; B23Q 17/10
(52) U.S. Cl. .......................... 474/40; 408/128; 116/233; 116/298
(58) Field of Search ........................ 474/37, 40; 408/128; 116/233, 298

(56) References Cited

U.S. PATENT DOCUMENTS

| | | | |
|---|---|---|---|
| 3,038,438 | * | 6/1962 | Taylor et al. ............... 116/298 X |
| 3,250,141 | * | 5/1966 | Luenberger ............... 474/37 |
| 3,467,177 | * | 9/1969 | Hoddinott ............... 474/40 X |
| 3,718,405 | * | 2/1973 | Keiter et al. ............... 408/128 |
| 5,061,124 | * | 10/1991 | Chen ............... 408/128 X |

* cited by examiner

Primary Examiner—Richard M. Lorence
(74) Attorney, Agent, or Firm—Charles E. Baxley

(57) ABSTRACT

A speed adjusting device for a drill press includes a first variable pulley mounted to the motor shaft and a second variable pulley mounted to the output shaft with a belt connected between the two variable pulleys. A pressing member is mounted to the second variable pulley and the first end of the pressing member is pivotally connected to a fixed member and the second end of the pressing member is connected to a control device. The control device has a connecting member connected to the second end of the pressing member so that the pressing member exerts a force to the second variable pulley by operating the control device to adjust the effective diameter of the belt in the first and the second variable pulley.

4 Claims, 6 Drawing Sheets

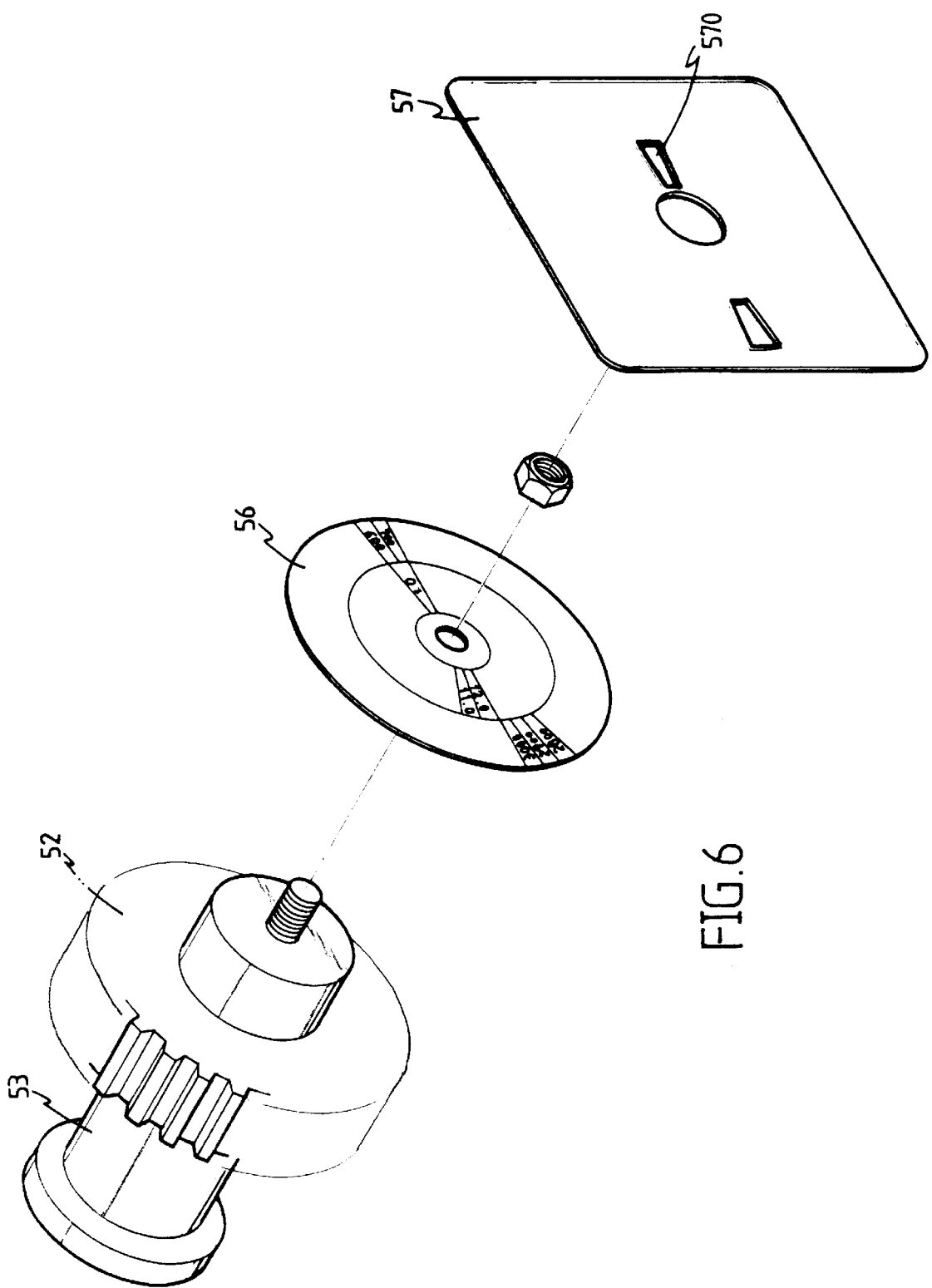

SPEED ADJUSTING DEVICE FOR A DRILL PRESS

FIELD OF THE INVENTION

The present invention relates to a speed adjusting device for a drill press. The device adopts a pressing device connected to the variable pulley on the output shaft so as to adjust a gap between the two disks of the variable pulley to adjust an effective diameter of the belt in the variable pulley. The pressing device is located beside the user.

BACKGROUND OF THE INVENTION

A conventional speed adjusting device for a drill press is shown in FIGS. 1 and 2 wherein a driving shaft (100) of a motor (10) has a first variable pulley mounted thereto which is composed of two first disks (14), and an output shaft (11) has a second variable pulley mounted thereto which is composed of two second disks (18), and a belt (16) rotatably reeves between the first variable pulley and the second variable pulley. Each of the first disks (14) and the second disks (18) has an inclined surface so that the belt (16) is movably between the two inclined surfaces of the two first disks (14) or second disks (18). That is to say, the effective diameter of belt (16) in the first variable pulley (14) and the second variable pulley (18) is adjustable. A cap (13) is threadedly mounted to the top of the driving shaft (100) so as to adjust the gap between the two first disks (14), and a spring (17) is mounted to the output shaft (11) so as to exert a force to the second disks (18). A drilling bit (12) is connected to the lower end of the output shaft (11) so as to drill an object. Because the cap (13) is connected to the driving shaft (100) which is located away from the user as shown in FIG. 2, so that when the user wants to operate the cap (13) to reduce or increase the gap between the two first disks (18), he/she has to leave his/her seat to operate the cap (13). If the gap between the first disks (14) are reduced, the effective diameter of the belt (16) in the first variable pulley is increased, and the effective diameter of the belt (16) in the second variable pulley (18) is then reduced, so that the speed of the output shaft (11) is increased. Whenever, the user wants to adjust the speed of the output shaft (11), he/she has to leave from his/her seat and the adjustment of the speed of the output shaft is rough.

The present invention intends to provide a speed adjusting device which has a control means to adjust a pressing device on the output shaft. The user simply operates the control means beside him/her to adjust the effective diameter of the belt in the variable pulley on the output shaft.

The present invention improves the shortcomings of the conventional speed adjusting device and the speed of the drill press can be adjusted steplessly.

SUMMARY OF THE INVENTION

In accordance with one aspect of the present invention, a speed adjusting device for a drill press is provided and comprises a first variable pulley composed of two first disks rotatably mounted to the motor shaft, a spring mounted to the motor shaft to push the two first disks toward each other. A second variable pulley comprising two second disks are rotatably mounted to the output shaft. A belt is connected between the first variable pulley and the second variable pulley.

A pressing member is mounted to the second variable pulley. A fixed member is pivotally connected to the first end of the pressing member and a control means is connected to the second end of the pressing member.

The main object of the present invention is to provide a speed adjusting device for a drill press wherein the effectively diameter of the belt in the two variable pulleys can be steplessly adjusted by operating a control means located beside the user.

Further objects, advantages, and features of the present invention will become apparent from the following detailed description with appropriate reference to the accompanying drawings.

BRIEF DESCRIPTION OF THE DRAWINGS

FIG. 6 is an exploded view of a mask and an indication card mounted to the control means of the present invention.

DETAILED DESCRIPTION OF THE PREFERRED EMBODIMENT

Figure 1:
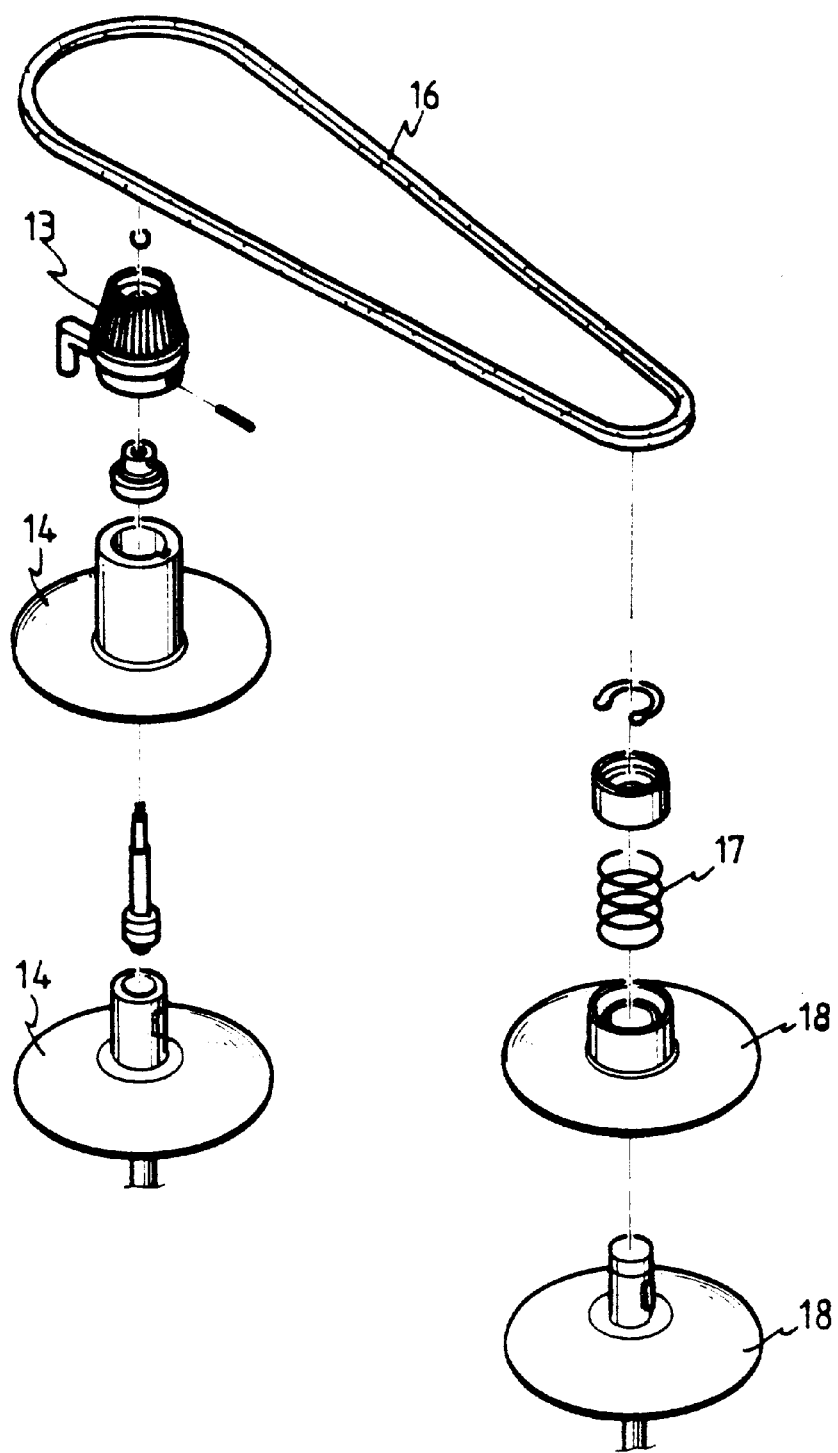
FIG. 1 is an exploded view of a conventional speed adjusting device for a drill press.
Figure 2:
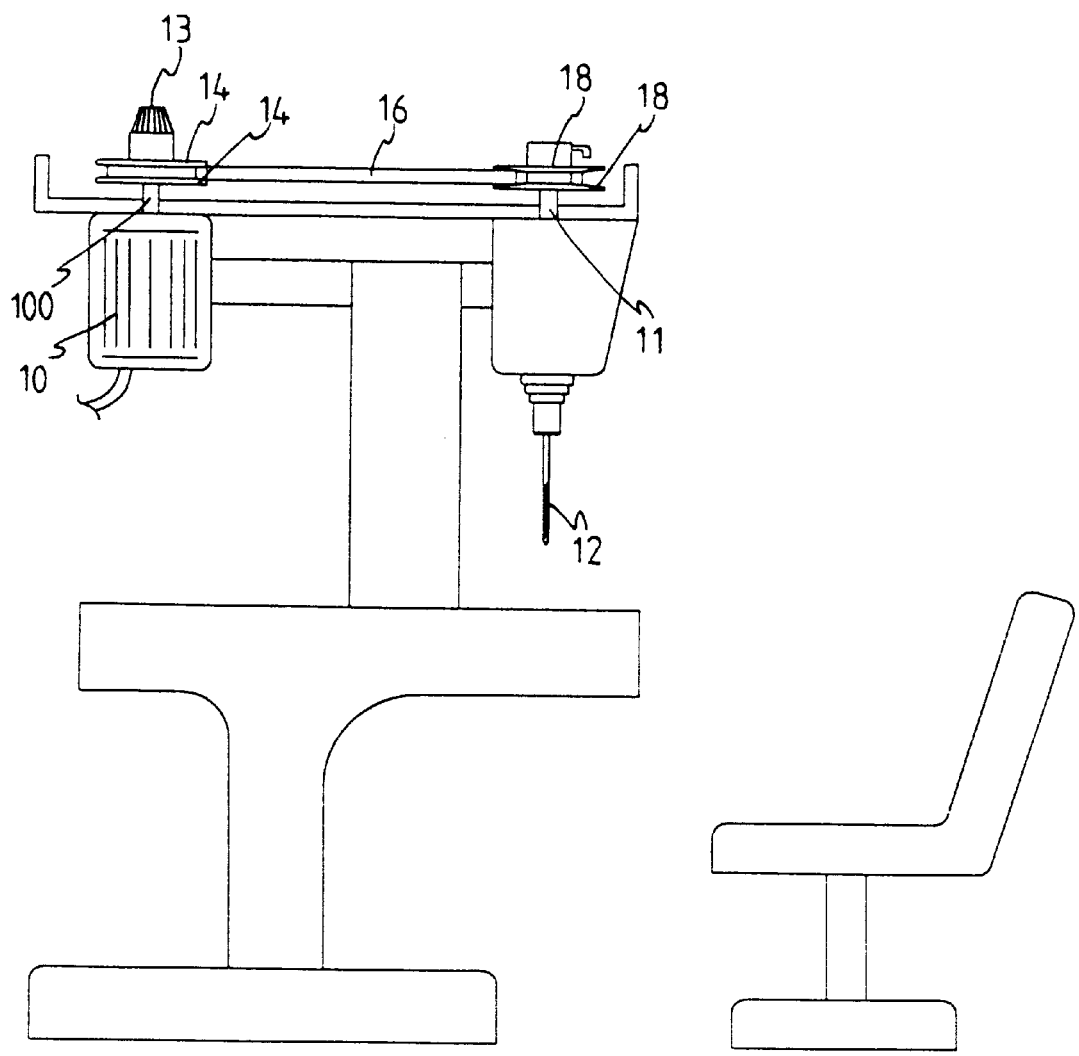
FIG. 2 is an illustrative view to illustrate that the cap of the conventional speed adjusting device is located far away from the user.
Figure 3:
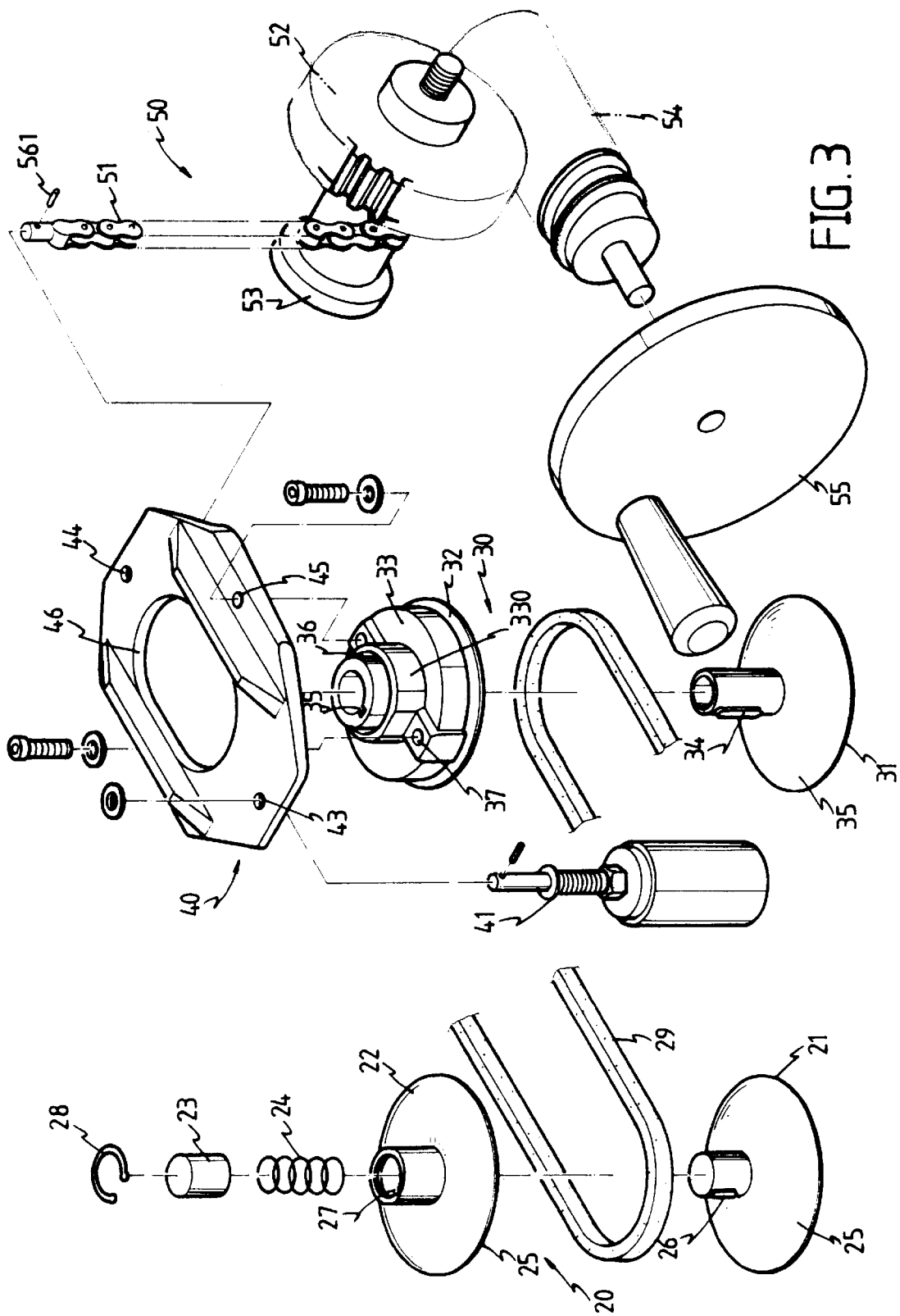
FIG. 3 is an exploded view of the speed adjusting device in accordance with the present invention.
Figure 4:
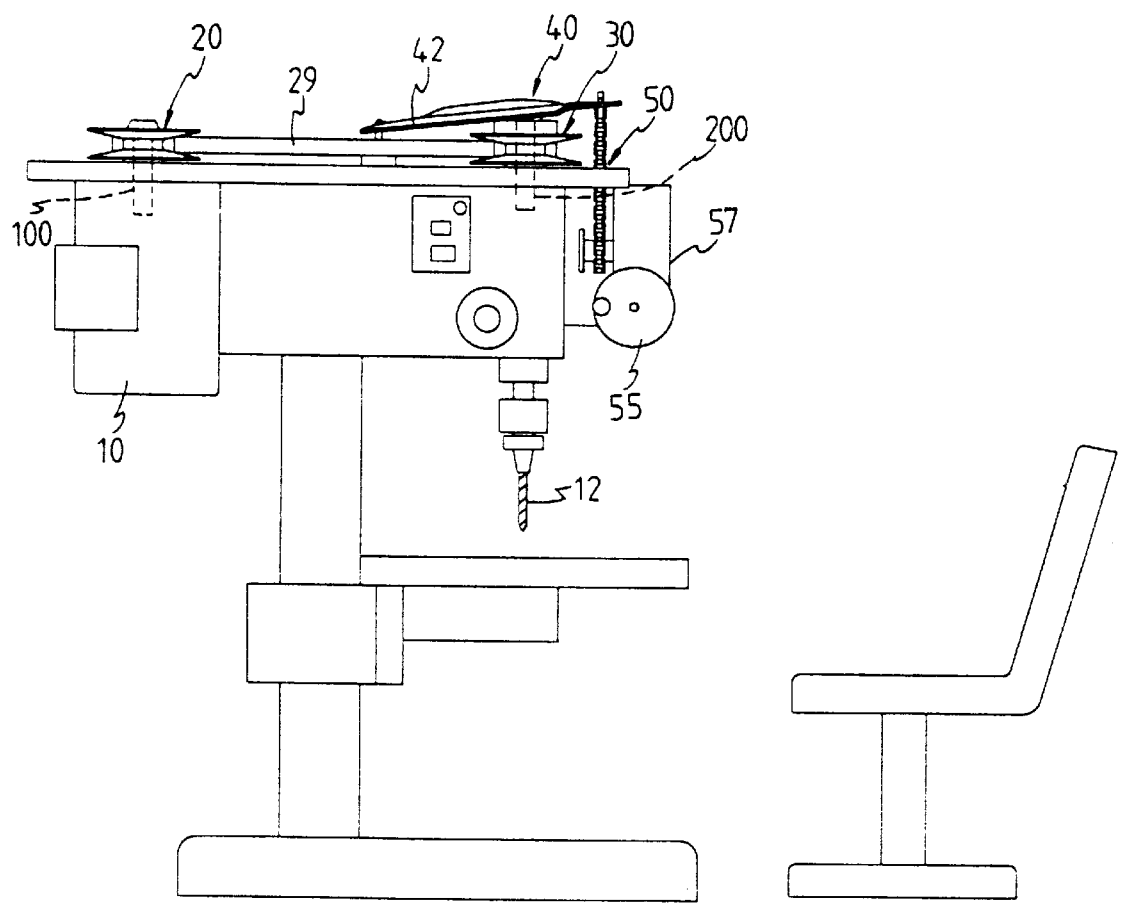
FIG. 4 is an illustrative view to illustrate that the control means of the speed adjusting device of the present invention is located beside the user.
Figure 5:
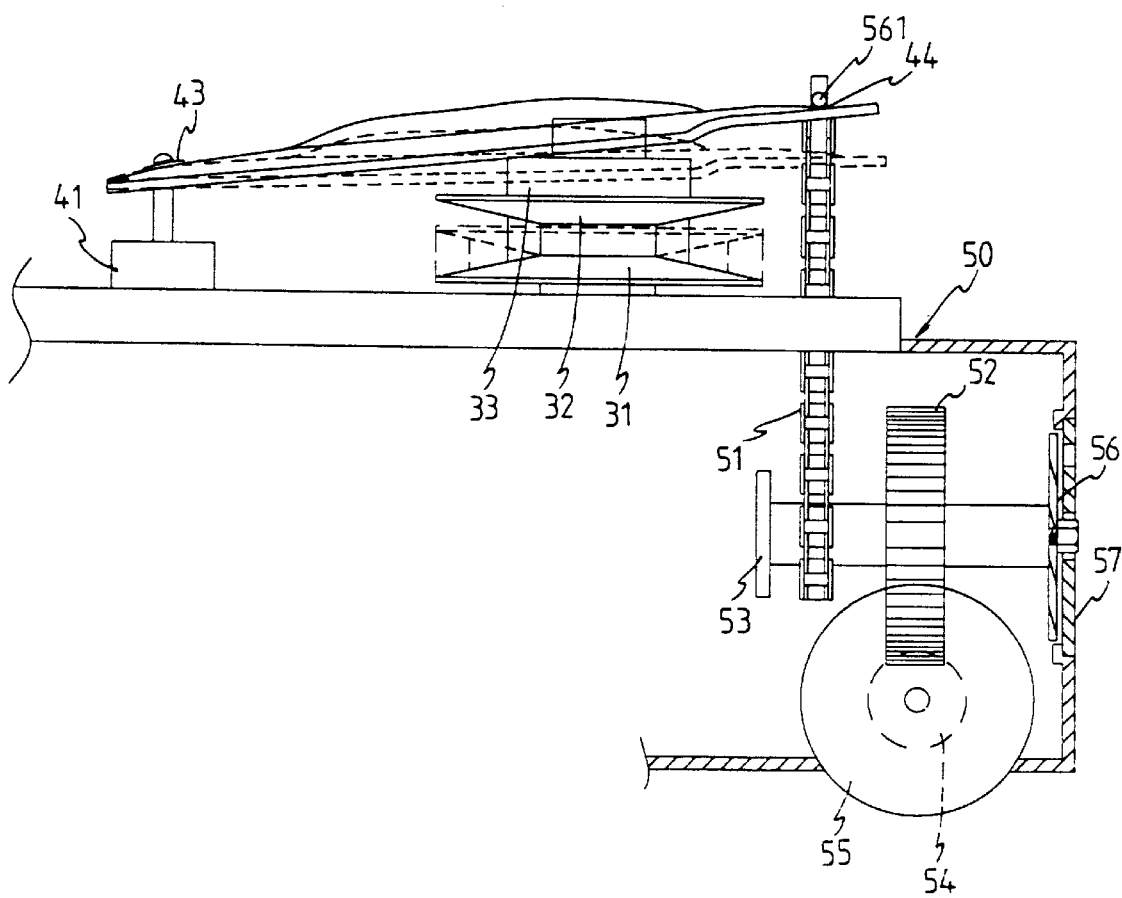
FIG. 5 is an illustrative view to illustrate the speed adjusting device of the present invention wherein the pressing member is pivoted to press the second variable pulley by operating the control means.

Referring to FIGS. 3 to 5, the speed adjusting device for a drill press which includes a motor shaft (100) driven by a motor (10) and an output shaft (200) which has a drill bit (12) connected to the lower end thereof. A first variable pulley (20) comprising two first disks (21, 22) is rotatably mounted to the motor shaft (100), each first disk (21/23) having an inclined surface (25) facing each other. The first disk (21) has a protrusion extending from the central portion of the inclined surface (25) thereof and the protrusion has a key (26) extending radially outward therefrom. The other first disk (22) has a tubular portion for receiving the protrusion of the first disk (21) therein. The inside of the tubular portion of the first disk (22) has a key way (27) defined radially inward therein so as to receive the key (26). A spring (24) is mounted to the motor shaft (100) and retained by a retaining hat (23) and a clip (28) so as to push the two first disks (21, 22) toward each other.

A second variable pulley (30) comprising two second disks (31, 32) is rotatably mounted to the output shaft (100) and each second disk (31/32) has an inclined surface (35). Similar to the first disks (21, 22), the two second disks (31, 32) are connected to each other by inserting the protrusion on the second disk (31) in the tubular portion in the other second disk (32), and the key (34) on the protrusion is engaged with the key way (35) in the inside of the tubular protrusion of the second disk (32). A belt (29) is connected between the first variable pulley (20) and the second variable pulley (30), and the belt (29) is engaged between the two respective pairs of inclined surfaces (25) of the two variable pulleys (20, 30).

A cap member (33) is mounted to the tubular portion of the second disk (32) with a bearing (36) connected between the cap member (33) and the tubular portion. The cap member (33) has a neck (330) extending from a top surface thereof. A pressing member (40) has a slot (46) defined centrally therethrough so that the neck (330) extends through the slot (46). The pressing member (40) has two side holes (45) so that the pressing member (40) is connected to the cap member (33) by extending bolts through the side holes (45) and the holes (37) defined in the cap member (33).

A fixed member (41) is located between the two variable pulleys (20, 30) and is pivotally connected to the first end of the pressing member (40) at the hole (43) of the pressing member (40).

A control means (50) is located beside the use and the output shaft (200). The control means (50) comprises a connecting member (51) which is a chain in this embodiment and the connecting member (51) is wrapped around a bar (53). The distal end of the connecting member (51) is fixedly connected to the second end of the pressing member (40) at the hole (44) by a pin (561). The bar (53) has a worm gear (52) connected thereto and a worm (54) is engaged with the worm gear (52). A disk (55) with a handle is connected to the worm (54) so that when rotating the disk (55) counter clockwise, the worm (54) rotates the worm gear (52) and the connecting member (51) pulls the second end of the pressing member (40) downwardly. The downward movement of the pressing member (40) will push the belt (29) in the second variable pulley (30) radially and outward. That is to say, the effective diameter in the second pulley (30) is increased and the effective diameter of the belt (29) in the first variable pulley (20) is then reduced. This will reduce the speed of the output shaft (200). When rotating the disk (55) clockwise, the connecting member (51) will be loosened and the effective diameter in the second variable pulley (30) is then reduced so that the speed of the output shaft (200) is increased.

Referring to FIG. 6, an indication card (56) is mounted to the worm (54) and necessary data is marked on the indication card (56). A mask (57) has two windows (570) and is mounted to the indication card (56) so that when rotating the disk (55) the corresponding data of the output shaft (200) can be read from the windows (570).

The invention is not limited to the above embodiment but various modification thereof may be made. It will be understood by those skilled in the art that various changes in form and detail may made without departing from the scope and spirit of the present invention.

What is claimed is:

1. A speed adjusting device for a drill press which includes a motor shaft (100) and an output shaft (200), said device comprising:

a first variable pulley (20) comprising two first disks (21, 22) adapted to be rotatably mounted to the motor shaft (100), each first disk (21/23) having an inclined surface (25), a spring (24) mounted to said motor shaft (100) to push said two first disks (21, 22) toward each other;

a second variable pulley (30) comprising two second disks (31, 32) adapted to be rotatably mounted to the output shaft (100), each second disk (31/32) having an inclined surface (35);

a belt (29) connected between said first variable pulley (20) and said second variable pulley (30);

a pressing member (40) mounted to the second variable pulley (30);

a fixed member (41) pivotally connected to a first end of said pressing member (40) and a control means (50) connected to a second end of said pressing member (40), said control means (50) comprising a connecting member (51) which is a chain and wrapped around a bar (53), a distal end of said chain fixedly connected to said second end of said pressing member (40), said bar (53) having a worm gear (52) connected thereto and a worm (54) engaged with said worm gear (52), said worm (54) having an indication card (56) mounted thereto and a mask (57) mounted to said indication card (56), said mask (57) having two windows (570), said indication card (56) having data marked thereon which is visible via said windows (570).

2. The speed adjusting device as claimed in claim 1 further comprising a cap member (33) connected to one of said two second disks (31, 32) and said pressing member (40) mounted to said cap member (33).

3. The speed adjusting device as claimed in claim 1 further comprising a disk (55) fixedly connected to said worm (54).

4. The speed adjusting device as claimed in claim 2, wherein said cap member (33) has a neck (330) extending from a top surface thereof and said pressing member (40) has a slot (46) defined centrally therethrough, said neck (330) extending through said slot (46).

* * * * *